United States Patent
Hörtner et al.

(10) Patent No.: US 7,216,035 B2
(45) Date of Patent: May 8, 2007

(54) METHOD AND DEVICE FOR DISPLAYING NAVIGATIONAL INFORMATION FOR A VEHICLE

(75) Inventors: Horst Hörtner, Kleinzell (AT); Dieter Kolb, Germering (DE); Gustav Pomberger, Linz (AT); Jan Wieghardt, München (DE)

(73) Assignee: Siemens Aktiengesellschaft, München (DE)

( * ) Notice: Subject to any disclaimer, the term of this patent is extended or adjusted under 35 U.S.C. 154(b) by 143 days.

(21) Appl. No.: 10/523,847

(22) PCT Filed: Jul. 7, 2003

(86) PCT No.: PCT/DE03/02271

§ 371 (c)(1),
(2), (4) Date: Feb. 7, 2005

(87) PCT Pub. No.: WO2004/018970

PCT Pub. Date: Mar. 4, 2004

(65) Prior Publication Data

US 2006/0155467 A1 Jul. 13, 2006

(30) Foreign Application Priority Data

Aug. 7, 2002 (DE) ............... 102 36 221

(51) Int. Cl.
*G01C 21/36* (2006.01)
*G05D 1/00* (2006.01)
*G08G 1/137* (2006.01)

(52) U.S. Cl. .............. 701/211; 701/200; 701/1; 701/28; 340/995.1

(58) Field of Classification Search ............... 701/1, 701/23–28, 200, 211, 208; 340/988, 995.1
See application file for complete search history.

(56) References Cited

U.S. PATENT DOCUMENTS

| | | | |
|---|---|---|---|
| 5,388,990 A * | 2/1995 | Beckman | 434/38 |
| 5,444,624 A * | 8/1995 | Wilkinson et al. | 703/8 |
| 5,734,357 A | 3/1998 | Matsumoto | |
| 6,088,527 A * | 7/2000 | Rybczynski | 396/1 |
| 6,411,896 B1 | 6/2002 | Shuman et al. | |
| 6,464,130 B1 * | 10/2002 | Itoh et al. | 228/245 |
| 6,735,517 B2 | 5/2004 | Engelsberg et al. | |
| 2002/0055808 A1 | 5/2002 | Matsumoto | |
| 2005/0060066 A1 * | 3/2005 | Buehler et al. | 701/2 |

FOREIGN PATENT DOCUMENTS

| | | |
|---|---|---|
| DE | 198 13 300 A1 | 10/1999 |
| DE | 100 37 573 A1 | 2/2002 |
| EP | 0 406 946 A1 | 1/1991 |
| EP | 0 406 946 B2 | 7/2001 |
| JP | 09113301 | 5/1997 |
| JP | 2000275057 | 10/2000 |
| JP | 2001141495 | 5/2001 |

* cited by examiner

*Primary Examiner*—Y. Beaulieu
(74) *Attorney, Agent, or Firm*—Cohen Pontani Lieberman & Pavane LLP

(57) ABSTRACT

According to the invention, navigational information for a vehicle is displayed intuitively and in an easily comprehensible manner in the form of a virtual pilot vehicle, superimposed on an image of the vehicle environment. The display mode and/or position and/or orientation and/or size of the virtual pilot vehicle are determined for example in accordance with the route information, speed, reference points for a recommended route, position and orientation of the vehicle or the camera that records the vehicle environment.

5 Claims, 3 Drawing Sheets

METHOD AND DEVICE FOR DISPLAYING NAVIGATIONAL INFORMATION FOR A VEHICLE

PRIORITY CLAIM

This is a U.S. national stage of application No. PCT/DE2003/002271, filed on Jul. 7, 2003. Priority is claimed on the following application(s): Country: Germany, Application No.: 102 36 221.1, Filed: Aug. 7, 2002.

BACKGROUND OF THE INVENTION

1. Field of the Invention

The invention relates to a method and a device in which navigational information for a vehicle is superimposed on an image of the vehicle environment, this graphic representation of the navigational information being transformed by a perspective transformation.

2. Description of Prior Art

Such a method or such a device is known from European patent application EP 0 406 946 A1.

In addition, there are navigation systems today which display to the driver the recommended route at a junction by means of pictograms and emit acoustic information, e.g. "Take the second turning on the right" or "Drive straight on at the roundabout". Some systems also additionally show the recommended route on a map.

A vehicle is deemed below to refer not just to land vehicles but also to watercraft and airplanes.

SUMMARY OF THE INVENTION

An object of the invention is to indicate a method and a device for displaying navigational information for a vehicle such that the route through road traffic to a defined destination is displayed to a vehicle driver in an intuitive and easily comprehensible manner.

According to the invention, this object is met by a method for displaying navigational information for a first vehicle to a driver of the first vehicle, including the steps of displaying navigational information for the first vehicle in the form of a virtual pilot vehicle superimposed on an image of the vehicle environment of the first vehicle, determining a position, an orientation and a size of the displayed virtual pilot vehicle based on a current speed of the first vehicle, reference points for a recommended route, a position and orientation of the vehicle, a position and orientation of a camera for recording the first vehicle environment and an eye position and a line of sight of the driver, and using the virtual pilot vehicle to display a route or action recommendation indicating to "keep minimum distance from the vehicle ahead in accordance with the current driving speed" by positioning the virtual pilot vehicle on the image of the vehicle environment such that it appears to be proceeding in front of the driver at precisely the minimum distance currently required. Driving too close to a second vehicle in front of the first vehicle is shown by the second vehicle being located in the image between the driver and the virtual pilot vehicle.

The further claims relate to preferred embodiments of the method according to the invention.

The invention will be described below with reference to embodiments represented in the drawings, in which:

DETAILED DESCRIPTION OF THE PREFERRED EMBODIMENTS

According to the invention, navigational information for a vehicle is displayed intuitively and in an easily comprehensible manner in the form of a virtual pilot vehicle superimposed upon an image of the vehicle environment. The display mode and/or the position and/or the orientation and/or size of the virtual pilot vehicle are determined, for example, in accordance with the route information, speed, reference points for a recommended route and the position and orientation of the vehicle or of the camera for recording the vehicle environment.

In a preferred embodiment of the invention, the navigational information is represented with the aid of a virtual pilot in the form of a stylized vehicle which appears to be proceeding in front of the driver on the recommended route. Through its virtual driving maneuvers, the virtual pilot vehicle draws the attention of the driver to imminent real driving maneuvers.

Figure 1:
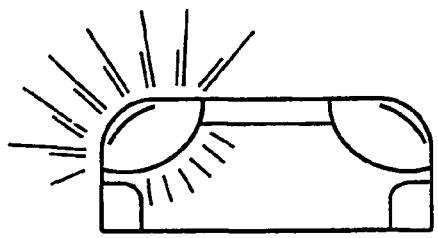
FIG. 1 is a view of a virtual pilot vehicle image displaying navigational information.
Figure 2:
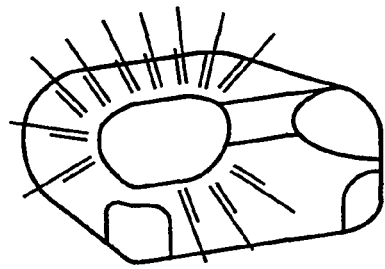
FIG. 2 is another view of a virtual pilot vehicle image displaying navigational information.
Figure 3A:
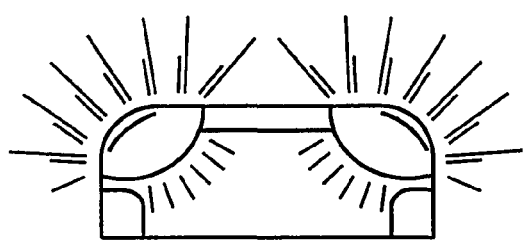
FIG. 3a is another view of a virtual pilot vehicle image displaying navigational information.
Figure 3B:
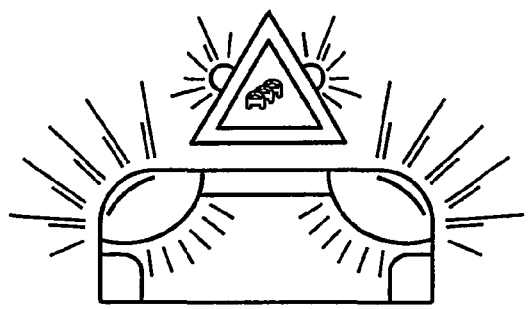
FIG. 3b is another view of a virtual pilot vehicle image displaying navigational information.
Figure 4:
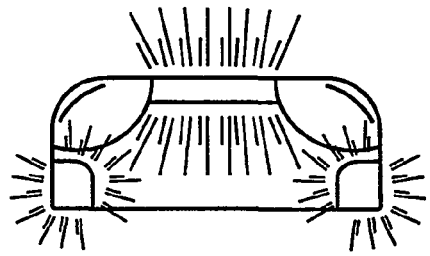
FIG. 4 is another view of a virtual pilot vehicle image displaying navigational information.

Through its actions, the virtual pilot vehicle can display to the driver intuitively and in an easily comprehensible manner route recommendations or other action recommendations. Examples of such recommendations may comprise the following:

1. a recommendation to "turn right" or "turn left", as shown in FIG. 1, is represented by a virtual pilot vehicle having a correspondingly flashing indicator;

2. a recommendation to "turn left onto a certain road" or to "turn right onto a certain road" as shown in FIG. 2, is represented by a correspondingly turning virtual pilot vehicle;

3. a recommendation to "drive carefully because of a safety hazard" approaching the driver, for example a traffic jam, roadworks, person driving on the wrong side of the road or similar, as shown in FIG. 3a, is represented by a virtual pilot vehicle with its hazard warning flashers activated. In addition, further information can optionally be displayed, as shown in FIG. 3b, via text or pictogram on a panel on the virtual pilot vehicle;

4. a recommendation to "reduce speed" as shown in FIG. 4, is displayed by the brake lights on the virtual pilot vehicle flashing on if the driver is driving too fast, e.g. because of a prevailing speed limit or because there is a sharp bend approaching; and 5. a recommendation to "keep the minimum distance from the vehicle ahead in accordance with the current speed" is displayed by a virtual pilot vehicle being positioned on the road such that it appears to be proceeding in front of the driver at precisely the minimum distance currently required. If a real vehicle is now located between the driver and the virtual vehicle, then the driver has driven up too close to the real vehicle in front.

Here, the virtual pilot vehicle is embedded in a video image of the real scene ahead of the vehicle of the driver and is shown on a display or projected in front of the driver onto the windshield of his/her vehicle.

Since the virtual pilot vehicle behaves in principle like a real vehicle guiding the driver, the recommendations and instructions which the virtual pilot displays visually are intuitively comprehensible to the driver.

The pilot vehicle appears to be proceeding at a certain distance, the pilot distance d, ahead of the actual vehicle. This distance is advantageously dependent on the current speed of the vehicle and possibly on the maximum speed permissible or recommended at the current point.

This pilot distance is determined for example as follows:

Let the driving speed v and any applicable maximum speed $v_0$ be given.

The unknown is the virtual pilot distance d.

If no maximum speed applies or if $v<v_0$, then $$d(v) = \max\left(5m, \frac{v*36}{20}s\right).$$

If $v>v_0$, it is recommended that the driver reduce speed. This is signaled by a shortening of the distance, i.e.

$$d(v) = \max\left(5m, \frac{v_0*36}{20}s - \frac{c*(v-v_0)*36}{20}s\right).$$

Here, the variable c can be chosen as fixed, e.g. c=2, or interpreted as a function of the type of road, e.g. c=2 in urban traffic, c=5 on country roads, c=6 on motorways.

Furthermore, in a preferred embodiment of the invention, the pilot position in global coordinates is determined as follows:

Let the vehicle position $\vec{P}$ in global coordinates, e.g. measured via GPS, the information about the route recommended by the navigational system in the form of n reference points $\vec{R}_i$ and the distance by which the pilot proceeds ahead of the vehicle on the recommended route d be given.

The unknown is the pilot position $\vec{L}$ in global coordinates and the pilot orientation $\vec{O}$ in global coordinates, where $\vec{O}$ forms the unit vector in the line of sight of the virtual pilot vehicle.

In order to determine the pilot position on the route, the position of the vehicle on the route must first be determined.

Figure 5A:
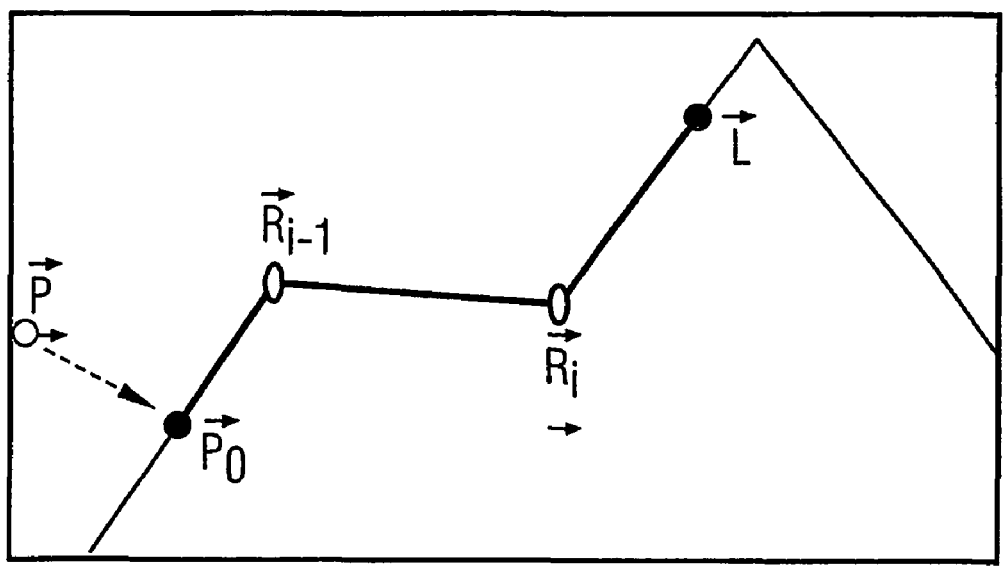
FIG. 5a is a schematic diagram of a route showing a position of the virtual pilot vehicle.
Figure 5B:
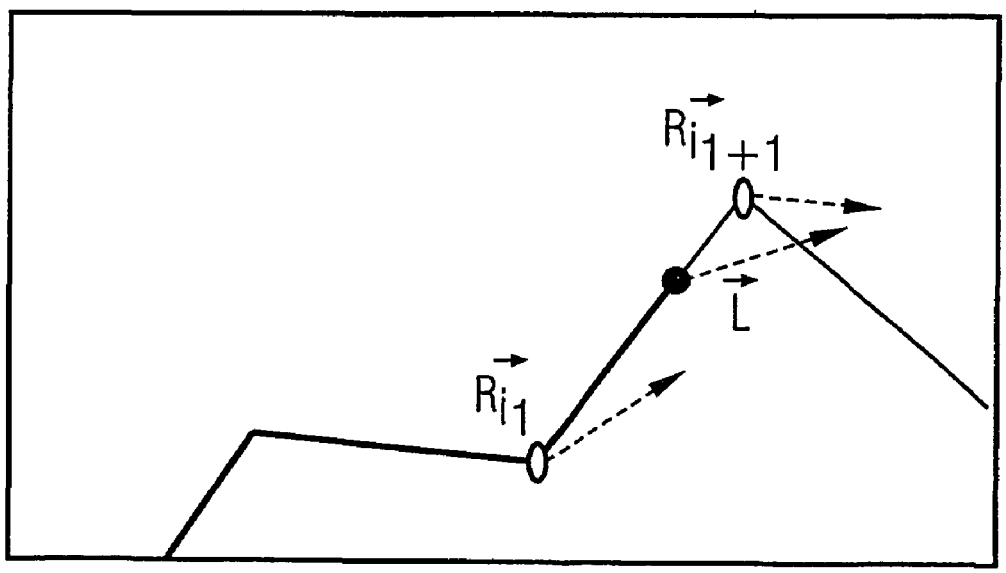
FIG. 5b is another schematic diagram of a route showing a position of the virtual pilot vehicle.

To this end, the measured position $\vec{P}$ of the vehicle is projected onto the route, as shown in FIGS. 5a and 5b.

One way of doing this is to find the point $\vec{P}_0 = (1-t_0)\vec{R}_{i_0} + t_0 \vec{R}_{i_0+1}$ on the route which has the minimum distance in the sense of the least squares to $\vec{P}$, i.e. $f(t,i) = |\vec{P} - ((1-t)\vec{R}_i + t\vec{R}_{i+1})|^2$ with $t \in [0,1[$ and $i \in \{1, \ldots, n\}$ has an absolute minimum at the point $t=t_0$ and $i=i_0$. The pilot position $\vec{L}$ is then given by $\vec{L} = (1-t_1)\vec{R}_{i_1} + t_1 \vec{R}_{i_1+1}$, where $t_1$ and $i_1$ are determined by $$d(v) = |\vec{L} - \vec{R}_{i_1}| + |\vec{P}_0 - \vec{R}_{i_0+1}| + \sum_{i=i_0+1}^{i_1-1} |\vec{R}_{i+1} - \vec{R}_i|.$$

The pilot orientation is now given by $$\vec{O} = \frac{1}{N}\left(\frac{(1-t_1)}{|\vec{R}_{i_1+1} - \vec{R}_{i_1-1}|}(\vec{R}_{i_1+1} - \vec{R}_{i_1-1}) + \frac{t_1}{|\vec{R}_{i_1+2} - \vec{R}_{i_1}|}(\vec{R}_{i_1+2} - \vec{R}_{i_1})\right)$$

with $$N = \left|\frac{(1-t_1)}{|\vec{R}_{i_1+1} - \vec{R}_{i_1-1}|}(\vec{R}_{i_1+1} - \vec{R}_{i_1-1}) + \frac{t_1}{|\vec{R}_{i_1+2} - \vec{R}_{i_1}|}(\vec{R}_{i_1+2} - \vec{R}_{i_1})\right|$$

Through a perspective transformation, a 2-dimensional representation of the pilot is determined from the pilot position and the pilot orientation for superimposing on the video image or for projecting onto the windshield:

Case 1: Superimposing on a Video Image

Let the pilot position $\vec{L}$, the pilot orientation $\vec{O}$, the parameters of the real camera and a 3-dimensional description of the pilot model be given.

The unknown is the 2-dimensional representation of the pilot.

The position of the pilot model can be calculated in global coordinates from $\vec{L}$ and $\vec{O}$. The projection images are computed from the parameters of a camera for recording the vehicle environment, and the model description of the pilot vehicle is projected onto the display plane.

Figure 6B:
FIG. 6b is a display of the virtual pilot vehicle image of FIG. 6a making a left turn.
Figure 6D:
FIG. 6d is a windshield display of the virtual pilot vehicle image of FIG. 6c making a left turn.
Figure 6A:
FIG. 6a is a display in which a virtual pilot vehicle image is shown in the vehicle environment as viewed by a driver.

The system is in this case equipped with a camera which records what happens in front of the vehicle. The virtual pilot vehicle is embedded into the individual video images in accordance with the route computed for the journey. The augmented reality image thus obtained is shown on a display within visual range of the driver (FIG. 6a).

In addition, for example, the recommended route for the journey is displayed. The further path of the virtual pilot vehicle is also visually displayed by the route for the journey FIG. 6b shows the virtual pilot vehicle shifted to the left relative to FIG. 6a to indicate that the next turn of the recommended route is a left turn. The left turn may further be indicated by a left blinking light on the virtual pilot vehicle.

Case 2: Projection onto the Windshield

Let the pilot position $\vec{L}$, the pilot orientation $\vec{O}$, the position and line of sight of the driver determined via sensors and a 3-dimensional description of the pilot model be given. The unknown is the 2-dimensional representation of the pilot. The position of the pilot model in global coordinates can be calculated from $\vec{L}$ and $\vec{O}$. The projection images are computed from the parameters of the eye position and line of sight, and the model description of the pilot vehicle is projected onto the display plane.

Figure 6C:
FIG. 6c is a windshield display of a virtual pilot vehicle image.

In this case, the eye position of the driver is determined, for example, first via a tracking system. Via a projection apparatus, the virtual vehicle is projected onto the appropriate point on the windshield in accordance with the route computed for the journey. (Fig.6c)

The recommended route for the journey, for example, is additionally projected onto the windshield. FIG. 6d shows the virtual pilot vehicle shifted to the left relative to the position in FIG. 6c to indicate that the virtual pilot vehicle is making a left turn.

What is claimed is:

1. A method for displaying navigational information for a first vehicle to a driver of the first vehicle, comprising the steps of:
   displaying navigational information for the first vehicle in the form of a virtual pilot vehicle superimposed on an image of the vehicle environment of the first vehicle;
   determining a position, an orientation and a size of the displayed virtual pilot vehicle based on a current speed of the first vehicle, reference points for a recommended route, a position and orientation of the first vehicle, a position and orientation of a camera for recording the first vehicle environment and an eye position and a line of sight of the driver, and
   using the virtual pilot vehicle to display a route or action recommendation indicating to "keep minimum distance from the vehicle ahead in accordance with the current driving speed" by positioning the virtual pilot vehicle on the image of the vehicle environment such that the virtual pilot vehicle appears to be proceeding in front of the driver at precisely the minimum distance currently required, while driving too close to a second vehicle in front of the first vehicle is shown by the second vehicle being located in the image between the driver and the virtual pilot vehicle.

2. The method of claim 1, wherein a position (L) of the virtual pilot vehicle and an orientation (0) of the virtual pilot vehicle are determined according to reference points (R) for a recommended route and according to the current position (P) and speed of the first vehicle.

3. The method of claim 2, wherein said step of displaying further comprises the steps of creating a model of the virtual pilot vehicle in three-dimensional space according to the pilot position and pilot orientation and computing a two-dimensional representation of the model and superimposing the two-dimensional representation on the image of the vehicle environment perceived by the driver.

4. The method of claim 1, further comprising the step of displaying further information including at least one of a text and a pictogram on a panel on the virtual pilot vehicle.

5. A device for displaying navigational information for a first vehicle to a driver of the first vehicle, comprising an apparatus for superimposing navigational information for the first vehicle in the form of a virtual pilot vehicle on an image of the vehicle environment of the first vehicle such that a position, an orientation and a size of the virtual pilot vehicle are determined in accordance with a current speed of the first vehicle, reference points for a recommended route, a position of the first vehicle, an orientation of the first vehicle, a position of the camera for recording the vehicle environment and an orientation of the camera for recording the vehicle environment, wherein a route or action recommendation to "keep minimum distance from the vehicle ahead in accordance with the current driving speed" is displayable by positioning the virtual pilot vehicle on the image of the vehicle environment such that the virtual pilot vehicle appears to be proceeding in front of the driver at precisely the minimum distance currently required, while driving too close to a second vehicle in front of the first vehicle is indicated when the second vehicle is located in the image between the driver and the virtual pilot vehicle.

* * * * *